(12) United States Patent
Jensen et al.

(10) Patent No.: US 10,905,973 B2
(45) Date of Patent: Feb. 2, 2021

(54) DEVICE FOR PROCESSING A LIQUID UNDER VACUUM PRESSURE

(71) Applicant: C.C. JENSEN A/S, Svendborg (DK)

(72) Inventors: Carl Aage Jensen, Svendborg (DK); Henning Buch, Svendborg (DK)

(73) Assignee: C.C. JENSEN A/S, Svendborg (DK)

(*) Notice: Subject to any disclaimer, the term of this patent is extended or adjusted under 35 U.S.C. 154(b) by 740 days.

(21) Appl. No.: 14/770,742

(22) PCT Filed: Feb. 27, 2014

(86) PCT No.: PCT/DK2014/050040
§ 371 (c)(1),
(2) Date: Aug. 26, 2015

(87) PCT Pub. No.: WO2014/131420
PCT Pub. Date: Sep. 4, 2014

(65) Prior Publication Data
US 2016/0008740 A1    Jan. 14, 2016

(30) Foreign Application Priority Data

Feb. 27, 2013 (DK) .................................. 2013 70111

(51) Int. Cl.
*B01D 19/00* (2006.01)
*F01M 1/10* (2006.01)
*F16N 39/06* (2006.01)

(52) U.S. Cl.
CPC ..... *B01D 19/0036* (2013.01); *B01D 19/0031* (2013.01); *F01M 1/10* (2013.01); *F16N 39/06* (2013.01)

(58) Field of Classification Search
None
See application file for complete search history.

(56) References Cited

U.S. PATENT DOCUMENTS

| 1,470,804 A | * | 10/1923 | Buckingham | ........... F04C 14/04 |
| | | | | 417/291 |
| 1,595,381 A | * | 8/1926 | Christensen | ............ F04C 29/02 |
| | | | | 418/32 |

(Continued)

FOREIGN PATENT DOCUMENTS

| CN | 1126797 A | 7/1996 |
| CN | 1534195 A | 10/2004 |

(Continued)

OTHER PUBLICATIONS

International Search Report dated Jul. 29, 2014 from corresponding International Patent Application No. PCT/DK2014/050040, 3 pages.

(Continued)

*Primary Examiner* — Robert J Popovics
(74) *Attorney, Agent, or Firm* — Ohlandt, Greeley, Ruggiero & Perle, L.L.P.

(57) ABSTRACT

A device for processing of a liquid that includes a device-input for receiving the liquid to be processed at an input-pressure, a device-output for returning the processed liquid at an output-pressure, a process chamber having a chamber-inlet and a chamber-outlet with the chamber-inlet being connected to the device-input via a feed-line, and the chamber-outlet being connected to the device-output via a discharge-line. The feed-line includes a pump for increasing the pressure of the liquid from the input-pressure to a feed-pressure at the chamber-inlet, and the discharge-line includes a back-pressure mechanism adapted to maintain a discharge-pressure at the chamber-outlet upstream of the back-pressure mechanism at an excess-pressure above the output-pressure, and to reduce the pressure of the liquid from the discharge-pressure to the output-pressure downstream of the back-pressure mechanism. The pump in the feed-line is a first stage of a multiple-stage gear pump. The back-pressure mechanism in the discharge-line is a second (Continued)

stage of the multiple-stage gear pump. The second stage is mechanically coupled to the first stage.

14 Claims, 3 Drawing Sheets

(56) References Cited

U.S. PATENT DOCUMENTS

| | | | | |
|---|---|---|---|---|
| 1,687,523 A * | 10/1928 | Staude | ............... | B60T 13/16 |
| | | | | 418/32 |
| 1,717,814 A * | 6/1929 | Schenck | ............ | F16H 57/0456 |
| | | | | 184/6.12 |
| 1,881,554 A * | 10/1932 | Heckert | ................ | F04C 14/04 |
| | | | | 417/239 |
| 2,103,530 A * | 12/1937 | Henry | ................ | F15B 11/17 |
| | | | | 172/812 |
| 2,136,318 A * | 11/1938 | Rossmann | ............ | B60T 13/16 |
| | | | | 60/548 |
| 2,148,561 A * | 2/1939 | Kempton | ................ | F04C 14/04 |
| | | | | 418/32 |
| 2,318,276 A * | 5/1943 | Worthington | ............ | F01M 1/12 |
| | | | | 184/6.28 |
| 2,607,295 A * | 8/1952 | Drucker | ................ | F04C 14/00 |
| | | | | 417/291 |
| 2,621,593 A * | 12/1952 | Schmiel | ................ | F15B 1/26 |
| | | | | 137/565.01 |
| 2,634,679 A * | 4/1953 | Kern, Jr. | ............... | F04C 15/06 |
| | | | | 418/206.1 |
| 2,778,316 A * | 1/1957 | Haight | ................ | F04C 14/04 |
| | | | | 418/32 |
| 2,842,065 A * | 7/1958 | Lease | ................ | F04C 2/14 |
| | | | | 418/47 |
| 2,865,301 A * | 12/1958 | Thomas | ................ | F04C 14/04 |
| | | | | 418/32 |
| 2,928,243 A * | 3/1960 | Albright | ............... | F15B 7/006 |
| | | | | 60/465 |
| 2,933,158 A * | 4/1960 | Pitts | ................ | F16D 57/06 |
| | | | | 188/274 |
| 2,965,040 A * | 12/1960 | Eisenberg | ................ | F04C 2/18 |
| | | | | 418/102 |
| 3,120,190 A * | 2/1964 | Schmitter | ............ | F04C 15/0023 |
| | | | | 418/144 |
| 3,196,800 A * | 7/1965 | Hoffer | ................ | F04C 15/0026 |
| | | | | 418/71 |
| 3,253,566 A * | 5/1966 | Jensen | ................ | B63H 25/28 |
| | | | | 114/150 |
| 3,312,177 A * | 4/1967 | Eckerle | ................ | F23K 5/147 |
| | | | | 417/310 |
| 3,575,296 A * | 4/1971 | Peterson | ................ | F04C 14/26 |
| | | | | 210/416.4 |
| 3,627,455 A * | 12/1971 | Nasvytis | ................ | F04C 14/12 |
| | | | | 418/66 |
| 3,679,335 A * | 7/1972 | Zippel | ................ | F04C 2/101 |
| | | | | 418/170 |
| 3,692,432 A * | 9/1972 | Liang | ................ | F04C 14/26 |
| | | | | 417/286 |
| 3,741,693 A * | 6/1973 | Stockton | ................ | B62D 5/22 |
| | | | | 418/15 |
| 3,824,041 A * | 7/1974 | Rystrom | ............... | F04C 15/062 |
| | | | | 417/310 |
| 3,847,519 A * | 11/1974 | Dworak | ................ | F04C 2/086 |
| | | | | 418/126 |
| 3,852,004 A * | 12/1974 | Foster | ................ | F04C 15/0019 |
| | | | | 418/131 |
| 3,857,461 A * | 12/1974 | Schmitt | ................ | B62D 55/13 |
| | | | | 184/6.2 |
| 3,912,427 A * | 10/1975 | Eckerle | ................ | F04C 2/101 |
| | | | | 418/71 |
| 3,981,646 A * | 9/1976 | Bottoms | ................ | F04C 2/084 |
| | | | | 418/190 |
| 3,994,634 A * | 11/1976 | Riddle | ................ | F04C 14/04 |
| | | | | 418/32 |
| 4,021,155 A * | 5/1977 | Erikson | ................ | F04B 53/06 |
| | | | | 417/302 |
| 4,040,505 A * | 8/1977 | Beveridge | ............... | B62D 55/13 |
| | | | | 184/6.28 |
| 4,127,365 A * | 11/1978 | Martin | ................ | F04C 2/18 |
| | | | | 417/410.1 |
| 4,193,746 A * | 3/1980 | Aman, Jr. | ................ | F04C 14/04 |
| | | | | 418/32 |
| 4,204,811 A * | 5/1980 | Carter | ................ | F04C 14/02 |
| | | | | 417/288 |
| 4,222,719 A * | 9/1980 | Johnson | ................ | F04C 14/04 |
| | | | | 418/171 |
| 4,245,964 A * | 1/1981 | Rannenberg | ............ | F02C 7/236 |
| | | | | 417/287 |
| 4,247,267 A * | 1/1981 | Lindtveit | ............... | F04C 14/04 |
| | | | | 418/32 |
| 4,255,093 A * | 3/1981 | Erikson | ................ | F04C 15/06 |
| | | | | 417/310 |
| 4,336,005 A * | 6/1982 | McBurnett | ........ | F04C 15/0019 |
| | | | | 418/126 |
| 4,420,292 A * | 12/1983 | Lutz | ................ | F04C 15/06 |
| | | | | 418/171 |
| 4,502,845 A | 3/1985 | Chana | | |
| 4,662,827 A * | 5/1987 | Wiernicki | ............... | F02M 37/08 |
| | | | | 417/363 |
| 4,719,998 A * | 1/1988 | Hiramatsu | ......... | B60K 17/3505 |
| | | | | 180/233 |
| 4,730,514 A * | 3/1988 | Shikata | ............... | B60K 17/3465 |
| | | | | 192/70.12 |
| 4,815,954 A * | 3/1989 | Underwood | ............... | F04C 2/14 |
| | | | | 417/283 |
| 4,879,981 A * | 11/1989 | Matsumoto | ............... | F01M 1/02 |
| | | | | 123/198 C |
| 5,087,177 A * | 2/1992 | Haley | ................ | F04C 14/02 |
| | | | | 417/288 |
| 5,487,403 A * | 1/1996 | Mollo | ................ | F04C 14/26 |
| | | | | 137/115.16 |
| 5,711,408 A * | 1/1998 | Dick | ................ | F04C 14/04 |
| | | | | 192/85.01 |
| 6,017,202 A * | 1/2000 | Durnack | ................ | F04C 14/04 |
| | | | | 418/166 |
| 6,045,338 A * | 4/2000 | Morita | ................ | F01L 1/34406 |
| | | | | 417/252 |
| 6,053,706 A * | 4/2000 | Allen | ................ | F04C 2/102 |
| | | | | 417/206 |
| 6,196,810 B1 * | 3/2001 | Taniguchi | ............... | F04C 23/001 |
| | | | | 417/248 |
| 6,205,779 B1 * | 3/2001 | Botosan | ................ | F04C 2/084 |
| | | | | 60/330 |
| 6,450,792 B1 * | 9/2002 | Eisenbacher | ......... | F01C 21/108 |
| | | | | 418/170 |
| 6,685,453 B2 * | 2/2004 | Oehman, Jr. | ............ | F04C 2/18 |
| | | | | 418/102 |
| 7,125,438 B2 | 10/2006 | Skoglund et al. | | |
| 7,677,263 B2 * | 3/2010 | Hoji | ................ | F04C 14/18 |
| | | | | 137/115.26 |
| 8,038,416 B2 * | 10/2011 | Ono | ................ | F04C 14/26 |
| | | | | 417/286 |
| 8,292,597 B2 * | 10/2012 | Rago | ................ | F04C 14/08 |
| | | | | 417/247 |
| 8,303,281 B2 * | 11/2012 | Robillard | ................ | F04C 2/18 |
| | | | | 418/102 |
| 9,080,573 B2 | 7/2015 | Welte et al. | | |
| 2003/0012664 A1 * | 1/2003 | Maier | ................ | F04C 11/005 |
| | | | | 417/310 |
| 2004/0179953 A1 | 9/2004 | Suzuki et al. | | |
| 2004/0213680 A1 * | 10/2004 | Suzuki | ............... | F04C 15/0076 |
| | | | | 417/310 |
| 2011/0017682 A1 | 1/2011 | Jensen | | |
| 2011/0180492 A1 | 7/2011 | Wilson | | |
| 2012/0211445 A1 | 8/2012 | Grotheim | | |
| 2016/0008740 A1 * | 1/2016 | Jensen | ............... | B01D 19/0031 |
| | | | | 95/266 |

(56) References Cited

U.S. PATENT DOCUMENTS

2016/0010797 A1* 1/2016 Jensen .................... F01M 1/10
                                                                       210/808
2020/0095997 A1* 3/2020 Wakabayashi .......... F04C 2/102

FOREIGN PATENT DOCUMENTS

| CN | 102065968 A | 5/2011 | | |
|---|---|---|---|---|
| CN | 102635556 A | 8/2012 | | |
| DE | 10117619 A1 | 3/2002 | | |
| EP | 1438115 B1 | 7/2004 | | |
| EP | 2961950 B1 * | 8/2017 | ............... | F01M 1/10 |
| EP | 2961949 B1 * | 10/2017 | ......... | B01D 19/0031 |
| FR | 2574867 A1 | 6/1986 | | |
| GB | 534634 | 3/1941 | | |
| NL | 1021687 C1 | 4/2004 | | |
| WO | 0226346 A1 | 4/2002 | | |
| WO | 2009115092 A1 | 9/2009 | | |
| WO | 2011049468 A1 | 4/2011 | | |

OTHER PUBLICATIONS

Written Opinion dated Jul. 29, 2014 from corresponding International Patent Application No. PCT/DK2014/050040, 6 pages.

* cited by examiner

DEVICE FOR PROCESSING A LIQUID UNDER VACUUM PRESSURE

BACKGROUND OF THE DISCLOSURE

1. Field of the Disclosure

The invention relates to a device for processing of a liquid, the device comprising a device-input for receiving the liquid to be processed at an input-pressure, a device-output for returning the processed liquid at an output-pressure, and a process chamber with a chamber-inlet and a chamber-outlet, the chamber-inlet being connected to the device-input via a feed-line, and the chamber-outlet being connected to the device-output via a discharge-line, wherein the feed-line comprises flow-rate control means for controlling the flow-rate of feeding liquid through the chamber-inlet into the process-chamber, and the discharge-line comprises discharge-pump means adapted to retrieve processed liquid through the chamber-outlet from the process chamber and return the liquid through the device-output.

According to a further aspect, the invention relates to a method for processing a liquid under vacuum.

In a particular aspect, the invention relates to a device and method for filtering oil under vacuum.

2. Description of the Related Art

Oil is used as a functional liquid in many mechanical and electrical systems. Examples for such use may comprise lubrication, hydraulics, or use as insulation oil in high-voltage power transformers. Numerous degradation and contamination processes affect the lifetime of the oil, as well as the operation, the maintenance and ultimately the lifetime of the machinery using the oil. Continuous cleaning of the used oil is therefore important. Cleaning used contaminated oil is, however, a challenging task where an appropriate process has to be composed for each application according to the type of contaminants to be removed and depending on the particular context of the system in which the cleaning task is to be performed. For example, oxygen and air may infiltrate an oil system, due to e.g. defect suction lines, insufficient de-aeration, inadequate tank design and tank breathing. This may lead to cavitation causing catastrophic break-down of e.g. a mechanical system, or increased oil compressibility, which reduces operating precision in e.g. a hydraulic system. Dealing properly with cavitation and compressibility is critical in industrial processes, where equipment reliability and lifetime are in constant focus. Other negative effects from oxygen- and air-contamination of oil are oil-oxidation/degradation and oil-moisturization leading to malfunction of the system using the oil as a functional liquid and to material degradation, such as in high-voltage power transformers where oxygen and moisture in the insulation oil is the major cause for degradation of paper insulation. A method for removing oxygen and air from the oil comprises processing of the oil under vacuum. However, known systems for processing a liquid under vacuum in a flow-through manner provide unsatisfactory control over the feed-flow or involve complex and tedious control systems for operating the device in a continous flow manner.

The object of the present invention is to provide a method and a device for processing a liquid under vacuum, which can be operated in a flow-through manner, and which overcomes at least some of the above mentioned draw-backs or at least provides an alternative to known methods.

According to a particular aspect, the object of the present invention is to provide a simplified and reliable method and device for processing oil, more particularly filtering oil, under vacuum.

SUMMARY OF THE DISCLOSURE

According to one aspect, the object is achieved by a device for processing of a liquid, the device comprising a device-input for receiving the liquid to be processed at an input-pressure, a device-output for returning the processed liquid at an output-pressure, a process chamber, and vacuum generating means communicating with a gas filled portion of the process chamber via a vacuum port for reducing the pressure therein to a vacuum-pressure, wherein the process chamber further has a chamber-inlet and a chamber-outlet, the chamber-inlet being connected to the device-input via a feed-line, and the chamber-outlet being connected to the device-output via a discharge-line, wherein the feed-line comprises flow-rate control means for controlling the flow-rate of feeding liquid through the chamber-inlet into the process-chamber, and the discharge-line comprises discharge-pump means adapted to retrieve processed liquid through the chamber-outlet from the process chamber and return the liquid through the device-output, wherein the flow-rate control means in the feed-line comprises a first stage of a multiple-stage gear pump, and the discharge-pump means in the discharge-line comprises a second stage of the multiple-stage gear pump.

The device allows for processing a liquid flown in a flow direction from the device-input to the device-output, wherein the processing is performed at a vacuum-pressure below the pressure of the liquid upstream of the device and below the pressure of the liquid downstream of the device. In the context of the present application, a vacuum-pressure refers to a pressure that is reduced as compared to the input- and output-pressures. Accordingly, processing at a vacuum-pressure refers to processing the liquid in the process chamber at a reduced pressure (vacuum) as compared to the input-pressure and the output-pressure. When operating the processing in the process chamber at a vacuum-pressure, the pressure at the chamber-inlet and the pressure at the chamber-outlet are therefore both less than the input-pressure and the output-pressure.

The process-chamber of the device comprises, as seen in the direction of flow from the chamber-inlet to the chamber-outlet, an upstream-plenum, a processing-element, and a downstream-plenum. The liquid to be processed is flown through the chamber-inlet into the upstream plenum located upstream of the processing element, passed through the processing element for processing the liquid into the downstream-plenum located downstream of the processing-element, and eventually leaves the downstream-plenum through the chamber-outlet.

The device may be used for any processing of the liquid passed through the process chamber, where the process requires stepping down the pressure from an input-pressure at the device-input to a feed-pressure at the chamber-inlet and stepping up the pressure from a discharge-pressure at the chamber-outlet to an output-pressure at the device-output. The stepping down is achieved by a first gear pump acting as a feed-flow dosing device controlling the feed-flow rate, and the stepping up is achieved by a second gear pump responsible for retrieving the processed liquid from the process-chamber under vacuum and returning the liquid through the device-output, wherein the first and second gear pumps are provided as the first and second stages of a multiple-stage gear pump.

The gear pump stages are fixed displacement machines displacing a constant amount of fluid for each revolution of a given gear wheel. The amount of displaced fluid per revolution is determined by the pump design including the actual gear wheel configuration and the layout of the displacement chamber in which the gear wheels of the respective gear pump stage operate. For a given gear pump stage and for a given rotation speed of the cooperating gear wheels defining the displacement, a displacement-rate expressed as the volume displaced through the respective gear pump stage per unit time is fixed. The first stage of the multiple-stage gear pump with a given layout thus provides a fixed feed-displacement rate depending on a pump speed selected for the given first stage. Accordingly, the second stage of the multiple-stage gear pump with a given layout provides a fixed discharge-displacement rate depending on a pump speed selected for the given second stage.

The first gear pump stage, through which the pressure is decreased along the flow-direction, may thus be operated as a dosing device for fixing the rate of the feed-flow from the input through the chamber-inlet into the process chamber, which is maintained under vacuum. Thereby it is avoided that an overpressure builds up in the processing chamber resulting in spill or damage to the first stage or spill-over of liquid into the vacuum-system. Furthermore, an excessive feed-flow spoiling the vacuum may be prevented, while ensuring an adequate/sufficient feed-flow to maintain a desired throughput for the processing. The second stage is operated as discharge-pump acting on the chamber-outlet for retrieving the processed liquid from the processing chamber. The pressure through the second stage increases along the flow direction.

Advantageously according to one embodiment of a device for processing a liquid at a vacuum-pressure, the displacement rate of the gear pump stage used for increasing the pressure (here the second stage), exceeds the displacement rate of the gear pump stage through which the pressure in the liquid flow is reduced (here the first stage). Thereby it is achieved that the feed-flow rate controlled by the first stage cannot exceed the discharge-flow rate through the second-stage, thus ensuring that the discharge-flow rate is sufficient for keeping the liquid level in the process chamber below a maximum level under operation, in order to prevent liquid from reaching the vacuum port. In a preferred simple configuration, due to this dimensioning of the gear pump stages, no additional control elements for controlling the flow through the process-chamber are required. However, in a typical set-up the second stage is protected by providing a flow resistance on the pressure side of the pump ensuring that a minimum of liquid remains in the pump to provide lubrication.

Means for generating vacuum, such as means comprising a vacuum-pump (e.g. of the liquid-ring type), are connected via a vacuum-port to the process-chamber to reduce the pressure inside the process-chamber as compared to the outside of the process-chamber. Most preferably, the vacuum port is located between the chamber-outlet and the nearest flow-limiting element as seen in an upstream direction. Typically, a processing element, such as a filter element, limits the flow through the process chamber leading to an accumulation of liquid to be processed in the upstream plenum, whereas the liquid level in the downstream-plenum is kept at a minimum. Typically, the vacuum port is therefore located in the downstream plenum, thereby avoiding that liquid can enter the vacuum system.

Advantageously, the second stage displacement rate exceeds the first stage displacement rate by between 20% and 40% of the first stage displacement rate, more advantageously by about 30% of the first stage displacement rate. It is thus conceived that an advantageous embodiment of a system for processing a liquid under vacuum is already achieved by providing first and second gear pumps in the feed-line and the discharge-line of the device, respectively, wherein the gear pumps are advantageously configured and dimensioned as discussed above, but without a mechanical coupling between the first and second gear pumps. In particular, by oversizing the discharge gear pump with respect to the feed gear pump this embodiment already achieves the advantage of providing a good control of the feed-flow and liquid level control for safely maintaining a vacuum also in continuous operation, without the need for any additional level control means, such as sensor means inside the chamber.

According to a further advantageous embodiment the second stage is mechanically coupled to the first stage. By mechanically coupling the first stage controlling the feed-flow rate to the second stage controlling the discharge-flow rate, an improved operational safety is achieved. In particular in the case of a failure resulting in a stop of the second stage, the first stage is also stopped automatically, thereby avoiding the buildup of an overpressure in the processing chamber resulting in spill or damage to the first stage or spill-over of liquid into the vacuum-system.

Preferably, according to one embodiment, the multiple-stage gear pump has a planar arrangement of meshing gear wheels defining the coupled stages. A planar arrangement of meshing gear wheels allows for a design with one-sided access to all components of the multiple-stage gear pump. This facilitates an easy assembly and maintenance of the multiple-stage gear pump as well as direct integration in a process-chamber wall with a pumping chamber for receiving the planar arrangement of meshing gear wheels, which is accessible from the outside of the process chamber wall.

Preferably according to a further embodiment of the device for processing a liquid at vacuum-pressure, the mechanical coupling between the first gear-pump stage and the second gear-pump stage has a fixed gear ratio. Thereby a simple and reliable setup is achieved, and a fixed ratio of a feed-flow rate through the first stage to a discharge-flow rate through the second stage is provided.

Preferably according to a further embodiment, the multiple-stage gear pump is a dual-stage gear pump with three meshing gear wheels. Thereby a particularly simple arrangement is achieved that reduces manufacturing cost and improves reliability. These advantages are particularly prominent when the dual-stage gear pump is implemented with a planar gear wheel arrangement.

Further, according to one embodiment, the first stage is defined by a first gear wheel meshing with a second gear wheel to provide displacement of the liquid from a first intake-port to a first discharge-port, and wherein the second stage is defined by the second gear wheel meshing with a third gear wheel to provide a second stage for displacement of liquid from a second intake-port to a second discharge-port. The first intake-port is connected to the device-input, the first discharge-port is connected to the chamber-inlet, the second intake-port is connected to the chamber-outlet, and the second discharge-port is connected to the device-output.

A number of different embodiments with different gear wheel arrangements are conceivable. In the following the term "outer toothing" refers to teeth provided on an outer surface of a gear wheel to form an external gear, and the term "inner toothing" refers to teeth provided on an inner surface of a gear wheel to form an internal gear.

Further according to one embodiment, an outer toothing on the first gear wheel meshes with an outer toothing on the second gear wheel to define the first stage as an external gear pump, and an inner toothing on the second gear wheel meshes with an outer toothing on the third gear wheel to define the second stage as an internal gear pump. Alternatively, an outer toothing on the first gear wheel meshes with an inner toothing on the second gear wheel to define the first stage as an internal gear pump, and an outer toothing on the second gear wheel meshes with an outer toothing on the third gear wheel to define the second stage as an external gear pump.

Further according to a preferred embodiment, an outer toothing on the first gear wheel meshes with an inner toothing on the second gear wheel to define the first stage as an internal gear pump, and an outer toothing on the second gear wheel meshes with an inner toothing on the third gear wheel to define the second stage as an internal gear pump. Alternatively, an inner toothing on the first gear wheel meshes with an outer toothing on the second gear wheel to define the first stage as an internal gear pump, and an inner toothing on the second gear wheel meshes with an outer toothing on the third gear wheel to define the second stage as an internal gear pump. Thereby, a particularly compact arrangement is achieved.

Advantageously, one or more of the above-mentioned stages that are implemented as internal gear pumps are of the crescent-type.

According to one embodiment, the multiple-stage gear pump comprises one driven gear wheel that is adapted to constitute a rotor of an electrical motor wherein stator coils are arranged in a peripheral housing wall 343 in the vicinity of the rotor. Advantageously, the gear wheel is adapted to constitute the rotor by distributing permanent magnets in a circular arrangement on the gear wheel, typically along the periphery thereof. The permanent magnetic field allows an external alternating electro-magnetic field generated by the stator coils to couple to and drive the gear wheel. The electro-magnetic coupling can be provided through a sealed housing wall, thus eliminating the need for a sealed feed-through for a rotating drive axle. Rotating axle seals have the disadvantage that they are prone to wear, are a potential source of leakage, and require additional attention for maintenance and/or repair. The electro-magnetic drive thus increases reliability and ease of operation of the device. Generally speaking, any of the gear wheels of the multiple-stage pump may be selected to be driven from an external drive. Accordingly, any of the gear wheels in the above-mentioned embodiments may be chosen to be equipped with permanent magnets and used as a rotor interacting with stator-coils that are suitably arranged/integrated in an adjacent housing wall of the multiple-stage gear pump to form an electromotor.

According to a preferred embodiment, the outermost gear wheel of a dual-stage internal gear pump constitutes the rotor of an electrical motor wherein stator coils are arranged in the peripheral housing wall around the rotor. Thereby a compact device with a high level of integration of the components is achieved without compromising production cost and reliability.

According to one embodiment, the device is adapted to oil filtration, wherein the process chamber comprises a filter element with an oil-filter medium for filtering oil. The filter element is arranged such that oil flown from the chamber-inlet to the chamber-outlet is forced to pass through the oil-filter medium, thereby separating the contaminated oil into a solid phase of solid contaminants, which is retained by the filter, and a liquid phase of cleaned oil, which is released as a filtrate through the chamber-outlet. The filter element partitions the process chamber in an upstream-plenum in which the chamber-inlet is located, and a downstream-plenum in which the chamber-outlet is located. Vacuum-generating means, such as comprising a liquid ring pump, are connected to the process-chamber via a vacuum-port. Preferably, the vacuum-port is located in the downstream-plenum. The filtration is thus performed at a vacuum-pressure, where the vacuum generating means ensures that the pressure in the process chamber at least on the downstream side of the filter medium is maintained at a reduced pressure below ambient pressure and below an output-pressure for returning the processed oil to a setup that is serviced by the device. The first stage of the multiple-stage gear pump communicates with the upstream-plenum via the chamber-inlet and doses the feed-flow of oil to be filtered by the filter-element. The second stage of the multiple-stage gear pump communicates with the downstream-plenum to retrieve and discharge the filtrate from the process-chamber. The second stage should be dimensioned and configured to provide sufficient pumping capacity to keep the oil-level in the process chamber below a maximum level so as to prevent oil from reaching the vacuum port and entering the vacuum generating system. The second stage should thus preferably be operated to provide a displacement rate exceeding that of the first stage, thereby ensuring that the feed-flow does not exceed the discharge-flow. This allows for controlling the oil-level in the process chamber by balancing feed- and discharge-flows without the need for any sensor arrangements for determining the oil-level inside the process-chamber under operation, thereby considerably simplifying the device and improving operational stability.

Preferably according to a further embodiment, the process chamber and the multiple-stage gear pump are integrated in a common housing, thereby achieving a compact design.

Further according to one embodiment, the multiple-stage gear pump defined by the arrangement of meshing gear-wheels is integrated on a first side of a base plate and the process chamber is defined on a second, opposite side of the base plate by a cover/lid/hat/housing, wherein feed and discharge-lines are provided as through-bores defining channels through the base plate, said channels connecting the pumping chambers on the first side of the base plate with the process chamber arranged on the second side of the base plate. Thereby a particularly compact, service-friendly assembly is achieved that facilitates easy production. In particular, these advantages are further enhanced when combined with an embodiment having a planar arrangement of meshing gear wheels defining the different stages of the multiple-stage gear pump.

According to a further aspect, the object of the invention is achieved by a method of processing a liquid under vacuum, wherein the method comprises the steps of receiving an input flow (201) of the liquid at an input-pressure (p1), feeding the input flow (201) as a feed-flow to a process chamber (209) through a chamber-inlet (208), said process chamber being maintained at a vacuum pressure using vacuum generating means coupled to the processing chamber via a vacuum-port, wherein an inlet-pressure (p2) at the chamber-inlet (208) is below the input-pressure (p1), controlling a feed-flow rate of the feed-flow,
processing the liquid in the process chamber (209),
retrieving the processed liquid from the process chamber (209) through a chamber-outlet (210), and discharging the processed liquid through the device output using pumping means, wherein a discharge-pressure (p3) at the chamber-outlet (210) is below an output pressure (p4) at the device-output (216), wherein the step of controlling the feed-flow rate is performed using a first stage (205) of a multiple-stage gear pump (222), and the step of retrieving and discharging the processed liquid is performed using a second stage (213) of the multiple-stage gear pump (222).

Most preferably, the second stage is mechanically coupled to the first stage.

Advantageously, the method according to the invention is performed using any of the above-mentioned embodiments of a device according to the invention. By these embodiments of a method according to the invention, the analogous advantages are achieved as discussed above with respect to the corresponding embodiments of a device according to the invention.

BRIEF DESCRIPTION OF DRAWINGS

In the following, the invention is further explained referring to an exemplifying embodiment. The drawings show on FIG. 1 A schematic of a prior art device operating in a set-up, FIG. 2 A schematic of one embodiment of a device according to the invention operating in a set-up, FIG. 3 An elevated view of a planar dual stage internal gear pump, and FIG. 3A A close-up view of a portion of FIG. 3.

DETAILED DESCRIPTION OF THE DISCLOSURE

Figure 1:
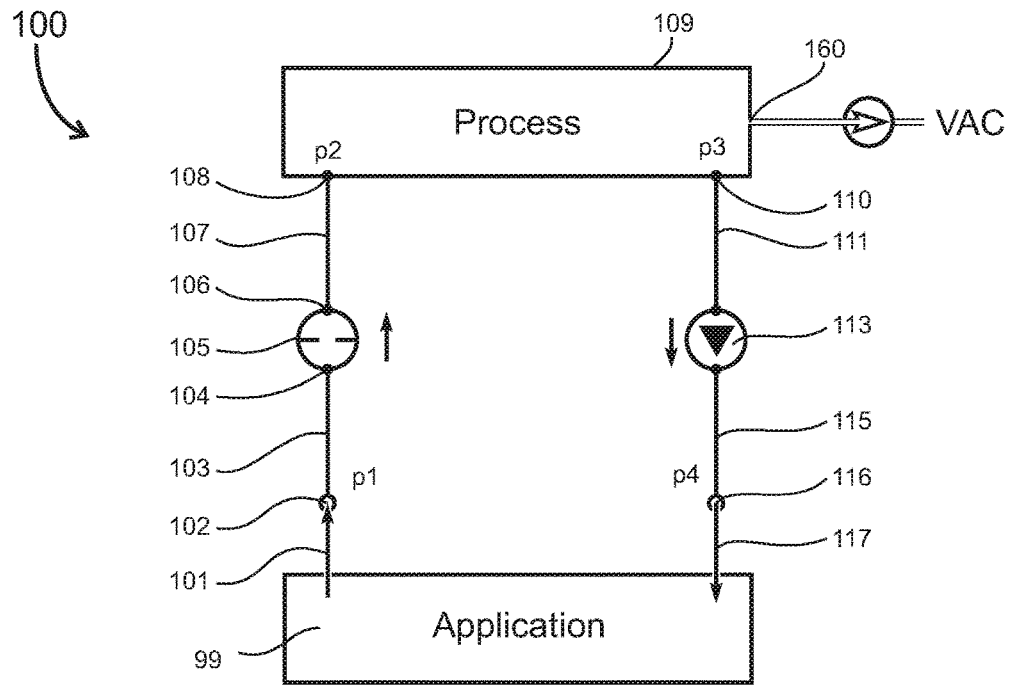

FIG. 1 shows schematically a prior art set-up with a device 100 for receiving a working liquid from a given application 99, processing the working liquid at a vacuum pressure and returning the processed liquid to its use in the given application 99. Arrows indicate the direction of flow through the set-up. An input-flow 101 of the working liquid is received at an input-pressure p1 at a device-input 102 of the device 100. From the device-input 102, the liquid is transferred to a flow constriction 105 via the first portion 103 of a feed line. The liquid leaves the flow constriction 105, and is fed through a chamber-inlet 108 via a second portion 107 of the feed-line to a process-chamber 109, where the liquid is processed. Vacuum generating means VAC, such as a liquid ring pump, are connected via a vacuum port to a gas-filled portion of the process chamber 109. Under operation, the vacuum generating means evacuate the gas-filled space so as to reduce the pressure in the process-chamber 109 as compared to the input-pressure. The flow-constriction limits the feed-flow through the feed-line 103, 107. The working liquid leaves the process-chamber 109 through a chamber-outlet 110. During the processing the pressure of the liquid may change by an amount dp. Typically a pressure drop occurs during the process, thereby reducing the pressure of the working liquid from a feed-pressure p2 at the chamber-inlet 108 to a discharge-pressure p3 at the chamber-outlet 110. From the chamber-outlet 110, the fluid passes through a first portion 111 of a discharge-line, a pump 113, and a second portion 115 of the discharge-line to a device-output 116. From the device-output 116, an output-flow 117 of the processed fluid is returned to the application 99 at an output-pressure p4 above the discharge-pressure p3. The device 100 is thus adapted to processing the working liquid in the processing chamber 109 at a vacuum pressure.

Figure 2:
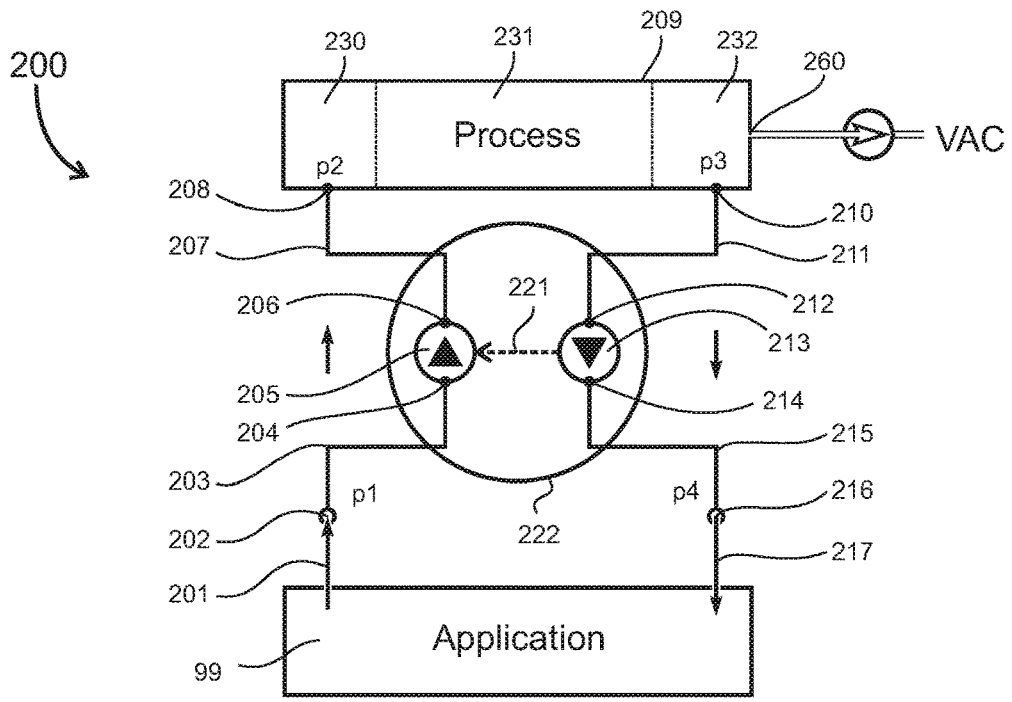

FIG. 2 shows schematically an improved device 200 for processing a liquid at a vacuum pressure according to one embodiment of the invention. The device 200 of FIG. 2 differs from the device 100 of FIG. 1 in that the flow constriction 105 and the pump 113 are replaced by a first stage 205 and a second stage 213 of a dual-stage gear pump 222. The gear pump stages 205, 213 are fixed displacement pumps and therefore provide a fixed displacement rate depending on the speed at which they are operated. The second stage 213 has a displacement rate exceeding the displacement rate of the first stage 205 and is mechanically coupled 221 to the first stage 205. By providing a fixed gear ratio for the mechanical coupling 221, the displacement rates of the first stage 205 and the second stage 213 are locked to each other, thereby ensuring that the capacity of the second stage 213 acting as a discharge-pump always exceeds the feed-flow rate determined by the first stage 205. The first stage 205 is thus operated as a dosing device defining the feed-flow rate and the second stage 213 is operated as a discharge-pump to always empty the process chamber 209 for liquid or at least keep the level of the liquid in a portion 232 of the process-chamber 209 where the vacuum port 260 is located below a maximum level, thereby avoiding that liquid reaches the vacuum system 260, VAC.

Figure 3:
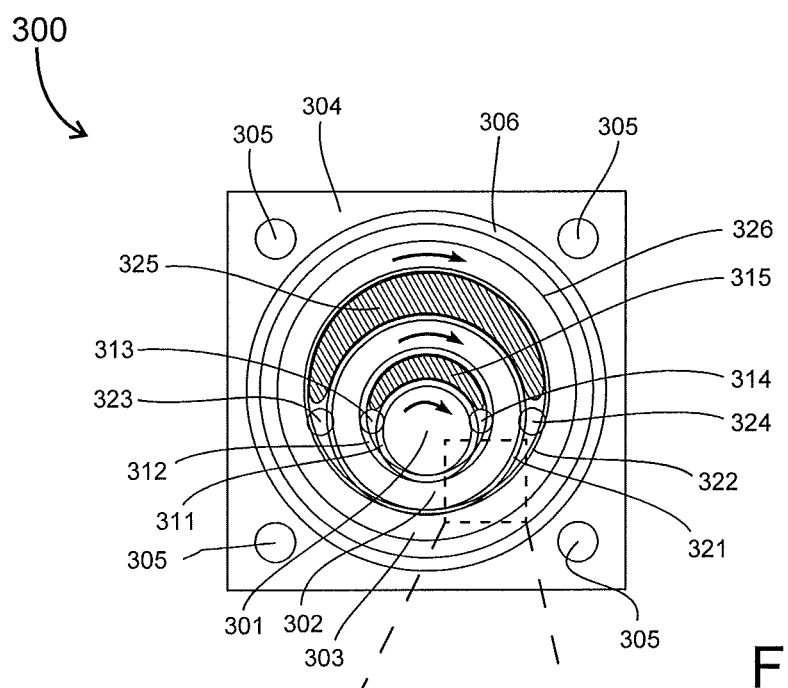
Figure 3A:
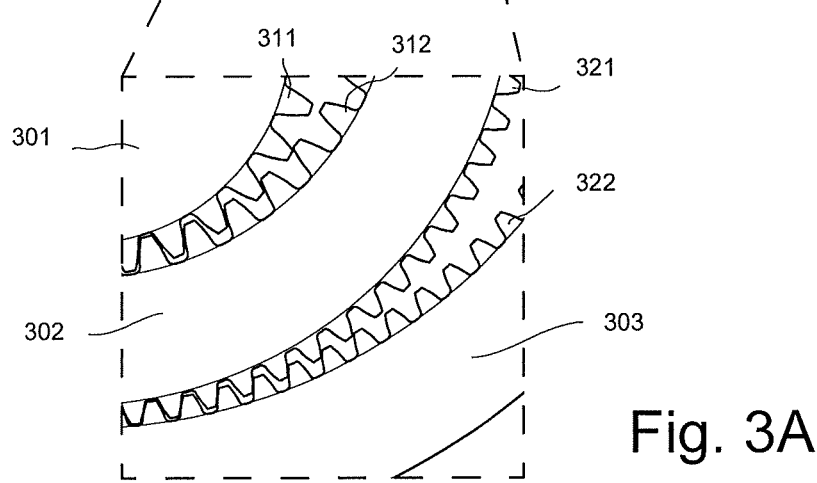

FIG. 3 shows schematically an elevated view of the inside of a dual-stage gear pump 300 with three meshing gear wheels 301, 302, 303, which are placed in a planar arrangement inside a pumping-chamber defined by a housing 304. The housing 304 features flange means, such as the bolt holes 305 and sealing means, such as the circumferential recess 306 for receiving an O-ring seal around the periphery of the pumping-chamber. The housing 304 may be sealed with a lid (not shown), which has a sealing surface cooperating with the sealing means 306 to provide a seal when the lid is attached to the flange means 305 of the housing 304. The embodiment shown has a particularly compact configuration, wherein the three gear wheels 301, 302, 303 are arranged within each other to form a dual-stage internal gear pump.

Considering that the first gear wheel 301 is driven by an external drive (not shown) in a clockwise direction, with the second and third gear wheels following in the same direction as indicated by the arrows, a first stage of the dual-stage gear pump 300 is defined by an outer toothing 311 on the first gear wheel 301, which meshes with an inner toothing 312 on the second gear wheel 302, thereby forming an internal gear pump providing displacement from a first intake-port 313 to a first discharge-port 314. A second stage of the dual-stage gear pump 300 is defined by an outer toothing 321 on the second gear wheel 302, which meshes with an inner toothing 322 on the third gear wheel 303, thereby forming an internal gear pump providing displacement from a second intake-port 323 to a second discharge-port 324. The second gear wheel 302 thus meshes with both the first gear wheel 301 and with the third gear wheel 303, thereby mechanically coupling the first and second stages of the dual-stage gear pump 300 to each other with a fixed gear ratio. Inner toothing 312 of second gear wheel 302 meshes with outer toothing 326 of third gear wheel 303.

The first and second internal gear pump stages of the shown embodiment are of the crescent-type, wherein the first stage comprises a first crescent 315 between the first gear wheel 301 and the second gear wheel 302, and the second stage comprises a second crescent 325 between the second gear wheel and the third gear wheel.

When operating the above-described dual-stage gear pump 300 in one embodiment of a device for processing a liquid at a vacuum pressure, such as the device shown in FIG. 2, the first intake-port 313 is connected to the device-input 202 for receiving liquid from an application 99. The first stage defined between the first and second gear wheels 301, 302 defines the feed-flow rate and the pressure decreases as seen in a direction along the flow from the input-pressure p1 to the feed-pressure p2. The first discharge-port 314 is connected to the chamber-inlet 208 for feeding the liquid to the process-chamber 209 at the feed-pressure p2 on the upstream-side of the process. The second intake-port 323 is connected to the chamber-outlet 210 for retrieving processed liquid from the process chamber 209. Passing through the second stage 213 the pressure increases as seen in a direction along the flow from the discharge-pressure p3 to the output-pressure p4. The second discharge-port 324 is connected to the device-output 216 for returning the processed liquid to the application 99. The device 200 comprising the planar dual-stage internal gear pump 300 is thus adapted to processing the liquid in the processing chamber 209 at a vacuum pressure. Due to the dimensioning of the stages and the mechanical coupling with a fixed gear ratio between the first and second stages, the second stage always operates at a displacement rate above the discharge rate required for keeping the portion 232 of the process chamber 209 located downstream of the processing element empty (or at least below a maximum level). The second stage therefore typically runs at a displacement rate exceeding the actual flow rate through the pump. To avoid that the second stage runs dry and suffers damage, in a typical set-up a flow resistance is preferably provided downstream of the second stage to ensure a minimum level of lubricating liquid in the second stage.

It should be noted that the roles of the meshing gear wheels of a multiple-stage gear pump in a device according to the invention may be interchanged, depending on how the intake- and discharge ports are connected, and depending on which of the meshing gear wheels is driven externally. For example, the outermost gear wheel 303 may be driven externally and form the first stage together with the intermediate gear wheel 302, wherein the outer intake- and discharge-ports 323, 324 are connected into the feed-line 203, 207 of the device 200. The second stage is then formed by the intermediate gear wheel 302 and the innermost gear wheel 301, wherein the inner intake- and discharge-ports 313, 314 are connected into the discharge-line 211, 215 of the device. The external drive of the outermost gear wheel 303 may be integrated into the housing by adapting the outermost gear wheel 303 to constitute a rotor of an electrical motor, e.g. providing permanent magnets (not shown) around the periphery of the outer gear wheel 303, and arranging cooperating stator coils (not shown) in the housing 304, the stator coils extending radially outward around the periphery of the outer gear wheel 303.

The housing 304 may further be adapted to comprise a process chamber defined between a base plate of the housing and a chamber cover, wherein the base plate is configured to receive the planar gear wheel arrangement forming the multiple-stage pump on one side, and further to attach the chamber cover on another side of the base plate in a sealed way, preferably on a side facing away from the multiple-stage gear pump. Most preferably, the base plate further comprises channels corresponding to the feed- and discharge-lines 203, 207, 211, 215 of the device of FIG. 2, with openings defining the device-input 202, the chamber-inlet 208, the chamber-outlet 210, and the device output 216.

Figure 4:
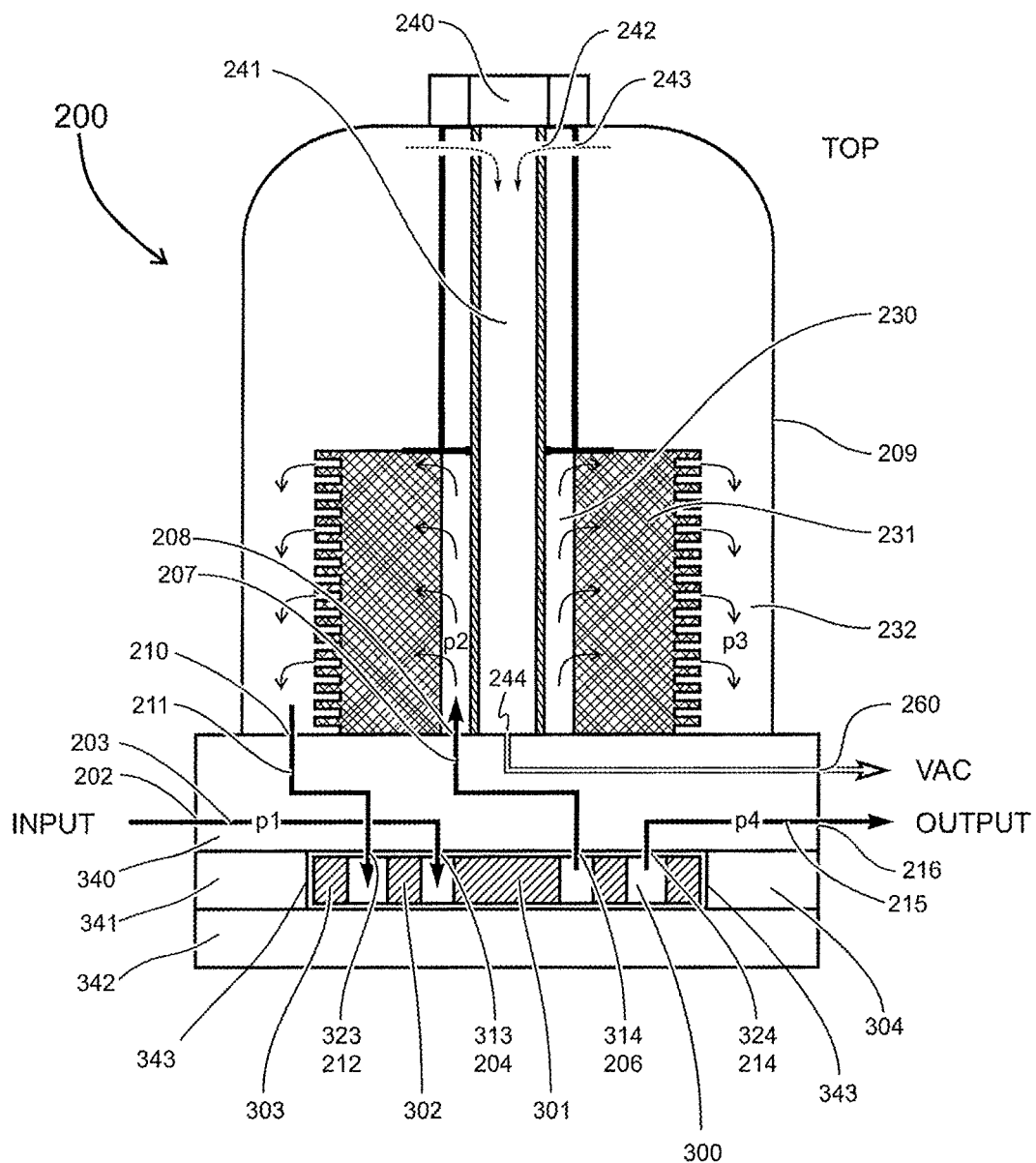
FIG. 4 A schematic view of a filter device according to one embodiment of the invention.

FIG. 4 shows schematicaly an embodiment of a filtering device 200 having an integrated planar dual stage internal gear pump 300. The filtering device 200 has a modular base 304 comprising three modules 340, 341, 342. A first module 340 comprises a device-input 201, a device-output 216, pump intake- and discharge-ports 204/313, 212/323, 206/314, 214/324, a chamber-inlet 208 and a chamber-outlet 210, as well as connecting conduits 203, 207, 211, 215. Module 340 further comprises a vacuum port 260. A second module 341 comprises a cavity defining a pumping chamber in which three meshing gear wheels 301, 302, 303 are placed in a planar arrangement so as to form a dual stage internal gear pump. The arrangement of the gear wheels 301, 302, 303 corresponds to that of the dual stage gear pump 300 shown in FIG. 3 as seen in a cut-plane perpendicular to the gear wheel plane and comprising the intake- and discharge-ports. The second module 341 communicates with the first module 340 through the intake- and discharge-ports 204/313, 212/323, 206/314, 214/324. A third module 342 provides an external drive for the second module 341. The external drive may be an electro-motor or a hydraulic motor coupled to one of the gear wheels, such as the innermost gear wheel 301, via a drive shaft and/or transmission (not shown). Alternatively, the motor module may couple magnetically to the respective driven gear wheel, or the motor module may comprise stator coils cooperating with a gear wheel of the second module configured as a rotor to form an electromotor as discussed above.

Directly adjacent to the base portion 304, filtering device 200 further has a process-chamber 209, which may be defined by a filter cover directly attached to the first module 340 in a sealing engagement and secured by a hollow stay-bolt 240. An axially extending centre-bore 241 of the hollow stay-bolt 240 communicates through passages 242, 243 with a top portion of the process-chamber 209 where free air/gas would accumulate under operation, and further communicates through a passage 244 with a vacuum-port 260. The processing chamber 209 communicates with the first module 340 via chamber inlet 208 and chamber-outlet 210. Inside the chamber 209, the filtering device 200 comprises a filter-element 231 concentrically arranged around the stay-bolt 240 which separates an upstream-plenum 230, that is defined as a sealed cavity between a radially inward facing surface of the filter-element 231 and the peripheral wall of the hollow stay-bolt 240, from a peripheral downstream-plenum 232, that is defined between a radially outward facing surface of the filter-element 231, and the peripheral wall of the process-chamber 209. The upstream-plenum 230 communicates with the chamber-inlet 208 and the downstream-plenum communicates with the chamber-outlet 210. Liquid entering the upstream-plenum 230 through the chamber-inlet 208 is thus forced to pass through the filter-element 231, before the liquid reaches the downstream-plenum 232 and leaves the process-chamber 209 through the chamber-outlet 210. Module 340 further comprises the vacuum port 260 communicating with an uppermost portion of the downstream plenum 232 where under operation free air/gas would accumulate. Using vacuum generating means connected to the vacuum port 260 of the device 200, the gas-filled uppermost portion of the downstream plenum 232 of the process chamber 209 is evacuated so as to reduce the pressure therein to a vacuum pressure below the input- and output-pressures p1, p4. While the vacuum port 260 connects with an uppermost portion of the process chamber where gas would accumulate, the chamber-outlet 210 is adapted to retrieve liquid from a level below a phase separation level under operation, i.e. the chamber-outlet 210 communicates with a bottom portion of the process chamber where the processed liquid would accumulate.

REFERENCE NUMBERS 99 application
100, 200 device
101, 201 input flow
102, 202 device-input
103, 203 feed-line
204 intake-port
105 flow constriction
206 discharge-port
107, 207 feed-line
108, 208, chamber-inlet
109, 209 process chamber
110, 210 chamber-outlet
111, 211 discharge-line
113 pump
115, 215 discharge-line
116, 216 device-output
117, 217 output-flow
205 first stage
212 intake-port
213 second stage
214 discharge-port
221 mechanical coupling (transfer of mechanical energy)
222 multiple-stage gear pump
230, 232 plenum
231 processing element
240 stay-bolt
241 central bore
250, 251, 252 bypass
260 vacuum port
300 planar dual-stage internal gear pump
301, 302, 303 gear wheels
304 housing
305 flange means
306 sealing means
311, 321 outer toothing
312, 322 inner toothing
313, 323 intake-port
314, 324 discharge-port
315, 325 crescent
340, 341, 342 housing module
p1 input-pressure
p2 feed-pressure
p3 discharge-pressure
p4 output-pressure

The invention claimed is:

1. A device for filtering of a liquid, the device comprising a device-input for receiving the liquid to be filtered at an input-pressure;
a device-output for returning a filtered liquid at an output-pressure;
a process chamber, wherein the process chamber has a chamber-inlet and a chamber-outlet and a filter element situated therebetween, a chamber-inlet being connected to the device-input via a feed-line, and the chamber-outlet being connected to the device-output via a discharge-line, wherein the feed-line comprises a first stage of a multiple-stage gear pump for controlling the flow-rate of a feeding liquid through the chamber-inlet into the process-chamber, wherein the discharge-line comprises a second stage of the multiple-stage gear pump that can retrieve the filtered liquid from the process chamber through the chamber-outlet and can return the filtered liquid through the device-output; and
a vacuum generator in gaseous communication with a gas filled portion of the process chamber via a vacuum port for reducing the pressure therein to a vacuum-pressure.

2. The device according to claim 1, wherein the second stage can operate at a displacement-rate exceeding that of the first stage.

3. The device according to claim 2, wherein the second stage can operate at a displacement-rate exceeding that of the first stage by between 20% and 40% displacement-rate of the first stage.

4. The device according to claim 2, wherein the second stage can operate at a displacement-rate exceeding that of the first stage by about 30% displacement rate of the first stage.

5. The device according to claim 1, wherein the second stage is mechanically coupled to the first stage.

6. The device according to claim 1, wherein the multiple-stage gear pump has a planar arrangement of meshing gear wheels defining the coupled stages.

7. The device according to claim 1, wherein the first stage is defined by a first gear wheel meshing with a second gear wheel to provide displacement of the liquid from a first intake-port to a first discharge-port, and wherein the second stage is defined by the second gear wheel meshing with a third gear wheel to provide a second stage for displacement of liquid from a second intake-port to a second discharge-port.

8. The device according to claim 7, wherein the first gear wheel either has an outer toothing that meshes with an inner toothing on the second gear wheel to define the first stage as an internal gear pump, and an outer toothing on the second gear wheel that meshes with an inner toothing on the third gear wheel to define the second stage as an internal gear pump, or the inner toothing that meshes with an outer toothing on the second gear wheel to define the first stage as an internal gear pump, and an inner toothing on the second gear wheel that meshes with an outer toothing on the third gear wheel to define the second stage as an internal gear pump.

9. The device according to claim 1, wherein one or more of the first and second stages are implemented as internal crescent gear pumps.

10. The device according to claim 1, wherein the multiple-stage gear pump comprises one driven gear wheel that constitutes a rotor of an electrical motor, and wherein cooperating stator coils are arranged in a peripheral housing wall in the vicinity of the rotor.

11. The device according to claim 1, wherein the filter element is an oil-filter medium capable of retaining solid contaminants therein.

12. The device according to claim 1, wherein the process chamber and the multiple-stage gear pump are integrated in a common housing.

13. The device according to claim 12, wherein the multiple-stage gear pump is defined by the arrangement of meshing gear-wheels that is integrated on a first side of a base plate and the process chamber is defined on a second, opposite side of the base plate by a chamber-cover sealing against the base plate, and wherein the feed and discharge lines are provided as through-bores defining channels through the base plate, the channels connecting the pumping chambers on the first side of the base plate with the process chamber arranged on the second side of the base plate.

14. A device, comprising:
- a device-input capable of receiving a liquid to be filtered at an input-pressure;
- a device-output capable of returning a filtered liquid at an output-pressure;
- a bolt;
- a process chamber defined between a base plate and a chamber cover for housing a filter element, wherein the process chamber has a chamber-inlet and a chamber-outlet, wherein the bolt extends through said chamber cover and the process chamber and secures said chamber cover to said base plate, the chamber-inlet being connected to the device-input via a feed-line, and the chamber-outlet being connected to the device-output via a discharge-line, wherein the feed-line comprises a first stage of a multiple-stage gear pump for controlling the flow-rate of a feeding liquid through the chamber-inlet into the process-chamber, wherein the discharge-line comprises a second stage of the multiple-stage gear pump that can retrieve the filtered liquid from the process chamber through the chamber-outlet and can return the filtered liquid through the device-output; and
- a vacuum generator in gaseous communication with a gas filled portion of the process chamber via a vacuum port for reducing the pressure therein to a vacuum-pressure, and wherein the device is capable of filtering the liquid when the filter element is positioned within the process chamber.

* * * * *